United States Patent [19]

Chin

[11] 3,812,371

[45] May 21, 1974

[54] SCANNING BEAM POSITION INDICATOR

[75] Inventor: Dick Yen Chin, Newton, Mass.

[73] Assignee: Itek Corporation, Lexington, Mass.

[22] Filed: Sept. 22, 1972

[21] Appl. No.: 291,500

[52] U.S. Cl......... 250/217 R, 250/219 FR, 178/7.6, 346/108

[51] Int. Cl............................................. G02f 1/28

[58] Field of Search............ 250/236, 219 FR, 216; 346/107, 108; 178/6.6 R, 7.6

[56] References Cited

UNITED STATES PATENTS

| | | | |
|---|---|---|---|
| 3,597,536 | 8/1971 | Fowler | 178/7.6 X |
| 3,626,091 | 12/1971 | Casper | 178/7.6 |
| 3,646,568 | 2/1972 | Woywood | 346/108 |
| 3,637,309 | 1/1972 | Hosterman | 250/236 |
| 2,883,557 | 4/1959 | Gallo | 250/210 FR |
| 3,384,753 | 5/1968 | Revesz | 250/236 X |
| 3,061,731 | 10/1962 | Thier et al. | 250/236 X |

*Primary Examiner*—Walter Stolwein
*Attorney, Agent, or Firm*—Homer C. Blair; Robert L. Nathans; William C. Roch

[57] ABSTRACT

A line start pulse generator for a laser beam recorder. In a typical laser beam recorder, a modulated laser beam is swept in a line scan across the width of a film strip. During the line scan, the film strip is transported a small increment in a direction transverse to the line scan. A second line is then recorded closely adjacent to the first line scan, and etc. for subsequent line scans. Tolerances within a typical laser beam recorder allow the exact lateral position of each line scan to vary from scan to scan. The disclosed invention generates a line start pulse to ensure that each line of recorded information is started at the same position relative to the film strip which results in accurate line to line registration on the film strip.

The line start pulse generator is placed at the beginning of a line scan across the film strip, and includes a beam splitter consisting of a mirror having an edge positioned transverse to the line scan. As the laser beam starts a line scan, it initially impinges upon the mirror which deflects the scanning beam onto a first photodiode. The scanning beam then traverses across the mirror edge onto a second photodiode. During this traversal by the laser beam there is a transition period during which the amplitude of the signal from the first photodiode is rapidly declining and the amplitude of the signal from the second photodiode is rapidly increasing. A comparator circuit, connected across the first and second photodiodes, detects when the amplitude of the second diode is equal to or greater than the amplitude of first diode, and generates a line start pulse at that instant. The line start pulse accurately indicates the starting position for the laser beam, and commands a data buffer to begin transmitting video to be recorded during that line scan.

10 Claims, 4 Drawing Figures

SCANNING BEAM POSITION INDICATOR

BACKGROUND OF THE INVENTION

The present invention relates generally to laser beam recorders, and more particularly pertains to a new and improved line start pulse generator for a laser beam recorder which ensures that each line of recorded information is started at the same position relative to the film strip. This results in accurate line to line registration on the film strip.

In a laser beam recorder, lines of modulated information are recorded very close together on a film strip, and tolerances within the recorder allow the exact lateral position of each line scan to vary from scan to scan. In a typical laser beam recorder, a multifaceted rotating mirror is utilized to direct the laser beam onto successive scan lines on the film strip. Small errors (on the order of ± ½ arc second) in the face to face angles of the multifaceted rotating mirror introduce timing errors in the line start positions. In the prior art these timing errors were either tolerated, or were minimized by the use of line start detection systems. Unfortunately, the line start detector systems of the prior art were not sufficiently accurate for demanded performance requirements in some applications.

SUMMARY OF THE INVENTION

In accordance with a preferred embodiment, an improved scanning beam indicator is disclosed for accurately indicating when a scanning beam is at a predetermined position with respect to a line scan across an information surface in the system. The scanning beam position indicator includes a first detector for detecting the scanning beam at a first initial position relative to the information surface during a line scan and a second detector for detecting the scanning beam at a second position, subsequent to the first initial position during a line scan. The preferred embodiment detects a predetermined relationship between the signal of the first detector and the signal of the second detector, and produces an output timing signal upon the occurrence of the predetermined relationship, which output timing signal indicates that the scanning beam is at a predetermined position with respect to the information surface. Further, the preferred embodiment provides such a scanning beam position indicator which is utilized as a line start position indicator, and wherein the first initial and second subsequent positions are both located near the start of a line scan across the information surface. Also, the preferred embodiment provides a scanning beam position indicator which detects when the amplitude of the second detector is equal to or greater than the amplitude of the signal of the first detector. Further, the preferred embodiment provides such an indicator which utilizes a deflector means with an edge positioned transverse to the movement of the scanning beam during a line scan.

Although the preferred embodiment has been described in context with a laser beam recorder, it should be realized that teachings of this invention are equally applicable to non-laser beam recorders and also to laser and non-laser beam readers wherein it is desired to accurately determine the position of a scanning beam. Also, although the scanning beam indicator of the preferred embodiment is a line start pulse generator, other embodiments might be constructed utilizing the teachings of this invention at other locations of the scanning beam relative to the information surface. For instance, the scanning beam position indicator might be utilized to detect the end or middle of a line scan rather than the beginning of a line scan.

DESCRIPTION OF A PREFERRED EMBODIMENT

Figures 1, 2, 3:
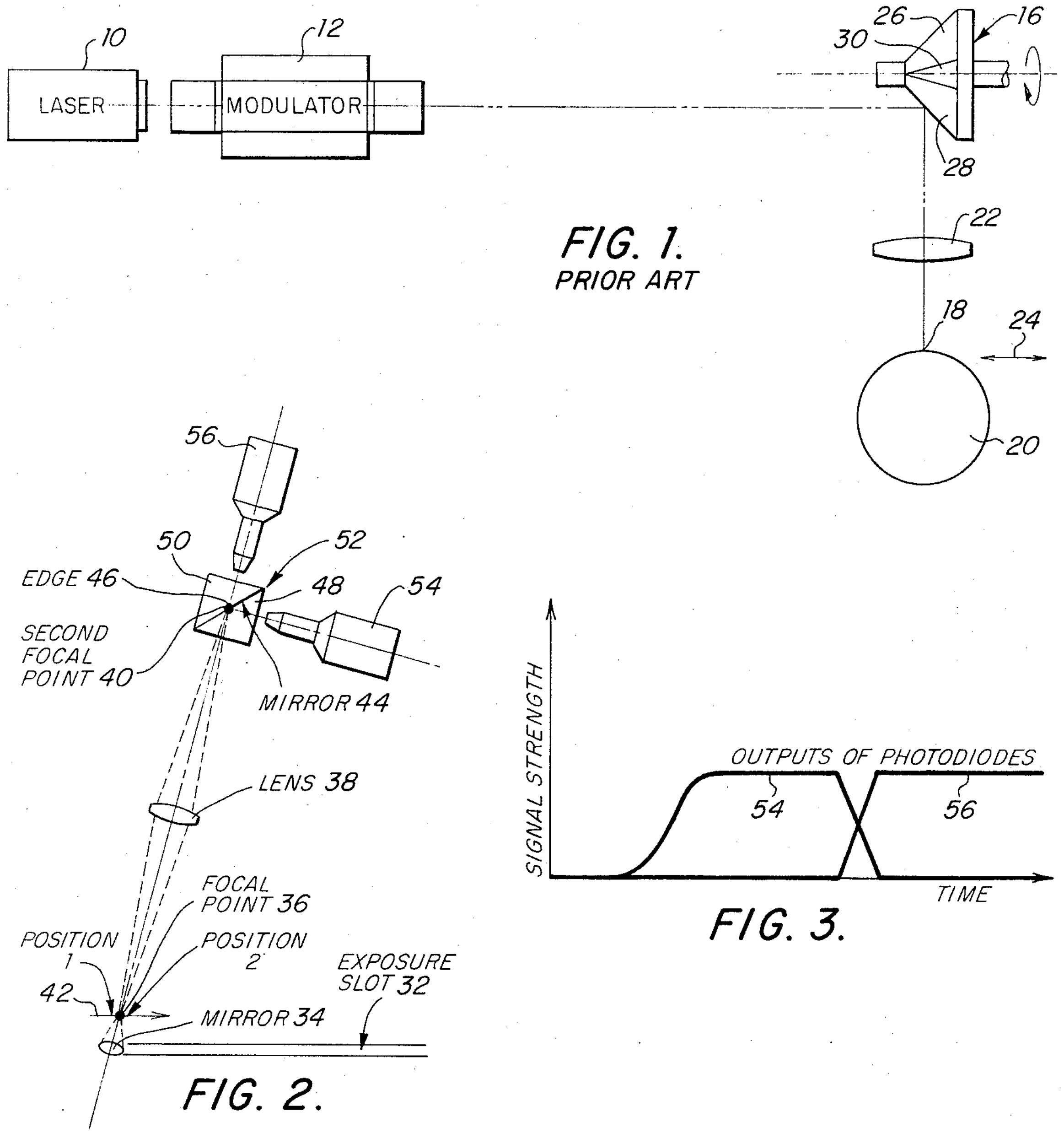
FIG. 1. PRIOR ART, FIG. 2., FIG. 3.
FIG. 1 illustrates a typical laser beam recorder/-reader.
FIG. 2 shows a preferred embodiment of a line start pulse generator for a recorder/reader such as is illustrated in FIG. 1.
FIG. 3 illustrates the waveforms of the two photodiodes of the line start pulse generator.

Referring to FIG. 1, there is illustrated a typical laser beam recorder/reader. While the apparatus is operating as a recorder, light from a laser source 10 is directed through a modulator 12 wherein information to be recorded modulates the intensity of the laser beam. The modulated laser beam is then directed through some intermediate elements, which are not shown as they are not important for an understanding of this invention, to a six sided rotating mirror 16. In alternative embodiments the multi-faceted rotating mirror might have other numbers of faces. The rotation of the bottom face of the mirror 16 sweeps the laser beam across the width of an unexposed film strip 18, located on a roller 20, in a direction perpendicular to the plane of the drawing. A lens system 22 is positioned between the rotating mirror and the film and focuses the laser beam onto the film. As a line of modulated information is being recorded on the film strip, the film is being continuously transported in a direction as indicated by arrow 24. After the film has been transported a small increment the next face of the rotating mirror sweeps the laser beam across a second line which is recorded, and etc. for subsequent lines of information.

When the apparatus is used as a laser beam reader, a strip of film having information recorded thereon is positioned in place of the unexposed film strip 18. A lens system and photodetector are positioned below the film, and the photodetector detects the modulation of the laser beam by the film strip. In a manner of operation similar to when the apparatus is used as a recorder, information on the film strip is read out on a line by line basis.

Angular errors are typically present in the face to face angles of the multifaceted mirror. Referring to FIG. 1, a first reflecting face 26 is separated from a second reflecting face 28 by a neutral triangular shaped area 30. The neutral area 30 allows time for the film strip to be transported a small increment between line scans as mentioned above. Reflecting faces 26 and 28 are two of the six reflecting faces of mirror 16. Ideally, the face to face angles between adjacent faces of the mirror should be exactly equal. Unfortunately, such exactly equal angles are almost impossible to obtain, and errors in these angles must be tolerated. These errors produce timing errors in the line start positions of successive line scans. In the prior art these timing errors were either tolerated or were minimized by the use of line start detection systems. The present invention provides a line start detection system superior to any known in the prior art.

FIG. 2 illustrates in detail the line start detection system of the preferred embodiment. In practice, the line start detection system of this invention could be located anywhere after the laser beam is reflected off the rotating mirror. In the preferred embodiment, the line start detection system is located adjacent to one end of an exposure slot 32 (not shown in FIG. 1) which is located directly above the film strip. A mirror 34 is placed at the beginning of the exposure slot. The laser beam reflects off the mirror 34 to a focal point 36. Focal point 36 is focused directly on the film strip at other locations along exposure slot 32. A relay lens system 38 transfers the focal point 36 to a second point 40. As focal point 36 moves to the right along a line scan as illustrated by arrow 42, the second focal point 40 moves to the left in an opposite direction. A mirrored surface 44 has an edge 46 positioned transverse to the movement of the second focal point 40 during a line scan. In the preferred embodiment mirrored surface 44 is formed as a reflective coating deposited on half of the surface of a prism 48. A second prism 50 is then cemented to the first prism such that the assembly 52 forms a cube with the mirrored surface inside. The elements are positioned such that the second focal point 40 is focused exactly on the edge 46 of the reflective coating. The assembly 52 is essentially a beam splitter which functions to direct the scanning beam first onto photodiode 54 when the second focal point is incident on mirrored surface 44, and secondly onto photodiode 56 when the second focal point passes over the mirror edge 46.

At the very beginning of a line scan when the focal point 36 is at position 1 in FIG. 2, the second focal point 40 falls on mirror surface 44 and the scanning beam is directed thereby onto photodiode 54. As the line scan proceeds toward position 2 in FIG. 2 the second focal point 40 moves to the left toward edge 46. As the second focal point 40 passes over edge 46, the amplitude of the signal from photodiode 56 increases while the amplitude of the signal from photodiode 54 decreases. This is graphically illustrated in FIG. 3 wherein the output of photodiode 54 suddenly slopes downward while the output of photodiode 56 suddenly slopes upward and crosses the signal from photodiode 54.

Figure 4:
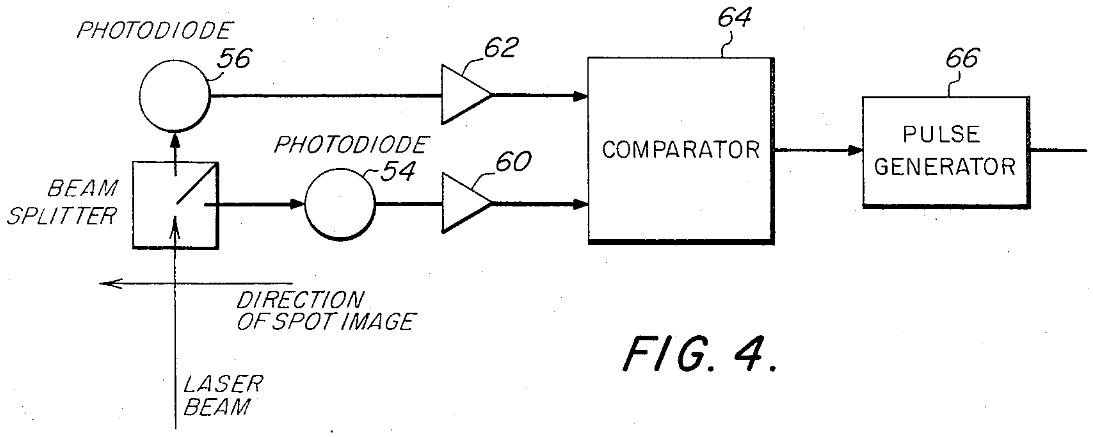
FIG. 4 is a block diagram of the circuitry of the line start pulse generator.

FIG. 4 shows a block diagram of a circuit for detecting a predetermined relationship between the outputs of photodiodes 54 and 56, which in the preferred embodiment is the exact moment of crossover of the outputs of photodiodes 54 and 56. The outputs of photodiodes 54 and 56 are amplified in circuits 60 and 62, and the amplified voltages are compared in circuit 64. When the difference between the two amplified output signals changes stage, which in the preferred embodiment is a change of sign, comparator circuit 64 triggers pulse generator 66 which produces a line start pulse. In the laser beam recorder, the line start pulse commands a data buffer to begin transmitting video to be recorded during that line scan. One embodiment which was built according to the teachings of this invention demonstrated repeatability of line start pulses to two-tenths of a nanosecond. This embodiment was utilized in a laser beam recorder wherein a six-sided mirror was rotated at 50,000 RPM. The precision of this invention results from the use of a crossover arrangement of two photodetectors rather than the comparison of one photodetector output with a fixed reference voltage, and also from the fast transition of the scanning beam across the mirror edge.

Although the preferred embodiment directs a second focal point of the scanning beam onto the beam splitter, alternative embodiments might be built utilizing only the first focal point to detect the position of the scanning beam. While several embodiments have been described, the teachings of this invention suggest many other embodiments to those skilled in the art.

I claim:

1. In a scanning beam recorder wherein a scanning beam is modulated as it is scanned in a plurality of line scans across a photosensitive medium positioned on an information surface to record the plurality of modulated line scans, the improvement comprising a system for accurately indicating when the scanning beam is at a predetermined line scan start position during each line scan to ensure each recorded line scan is started at the same precise position relative to the photosensitive medium and thereby provide precise lateral registration of the plurality of line scans comprising:

a. first detector means for detecting the scanning beam at a first initial position relative to said information surface at the start of a line scan and for producing a signal indicative of the intensity of the detected beam;

b. second detector means for detecting the scanning beam at a second position, subsequent to said first initial position during the start of a line scan, relative to said information surface and for producing a signal indicative of the intensity of the detected beam; and c. means, coupled to said first and second detector means, for detecting a predetermined relationship between the signal of said first detector means and the signal of said second detector means, and for producing an output signal upon detection of said predetermined relationship, said output signal indicating that the scanning beam is at a predetermined start position with respect to a line scan across said information surface.

2. An instrument as set forth in claim 1 wherein said means for detecting a predetermined relationship includes means for detecting when the amplitude of the signal of said second detector means is equal to or greater than the amplitude of the signal of said first detector means.

3. An instrument as set forth in claim 1 and including means, positioned to intercept the scanning beam, for splitting the scanning beam according to its position along a line scan and for directing the scanning beam first to said first detector means when the scanning beam is at said first initial position, and secondly to said second detector means when the scanning beam is at said second position.

4. An instrument as set forth in claim 4 wherein said splitting means includes a deflector means for deflecting at least a portion of the scanning beam to said first detector means when the scanning beam is at said first initial position and for passing at least a portion of the scanning beam to said second detector means when the scanning beam is at said second subsequent position, said deflector means having at least one deflector surface with an edge, said edge being positioned transverse to movement of the scanning beam during a line scan.

5. An instrument as set forth in claim 4 and including:

a. means for focusing the scanning beam at a first focal point on the information surface;
b. optical means for transfering the scanning beam to a second focal point; and
c. said means for splitting the scanning beam is positioned at said second focal point.

6. An instrument as set forth in claim 5 wherein said means for detecting a predetermined relationship includes means for detecting when the amplitude of the signal of said second detector means is equal to or greater than the amplitude of the signal of said first detector means.

7. In an instrument wherein a scanning beam is scanned in a line scan across an information surface, an improved scanning beam position indicator for accurately indicating when the scanning beam is at a predetermined position with respect to a line scan across the information surface and comprising:

a. first detector means for detecting the scanning beam at a first initial position relative to said information surface and for producing a signal indicative of the intensity of the detected beam;
b. second detector means for detecting the scanning beam at a second position, subsequent to said first initial position during a line scan, relative to said information surface and for producing a signal indicative of the intensity of the detected beam;
c. means for focusing the scanning beam at a first focal point on the information surface;
d. optical means for transferring the scanning beam from said first focal point to a second focal point;
e. means, positioned at said second focal point, for splitting the scanning beam according to its position along a line scan and for directing the scanning beam first to said first detector means when the scanning beam is at said first initial position, and secondly to said second detector means when the scanning beam is at said second position; and
f. means, coupled to said first and second detector means, for detecting a predetermined relationship between the signal of said first detector means and the signal of said second detector means, and for producing an output signal upon detection of said predetermined relationship, said output signal indicating that the scanning beam is at a predetermined position with respect to a line scan across said information surface.

8. An instrument as set forth in claim 7 wherein said improved scanning beam position indicator indicates when the scanning beam is at a predetermined start position with respect to a line scan across the information surface, and said first initial position and said second subsequent position are both located near the start of a line scan across the information surface.

9. An instrument as set forth in claim 8 wherein said means for detecting a predetermined relationship includes means for detecting when the amplitude of the signal of said second detector means is equal to or greater than the amplitude of the signal of said first detector means.

10. An instrument as set forth in claim 9 wherein said splitting means includes a deflector means for deflecting at least a portion of the scanning beam to said first detector means when the scanning beam is at said first initial position and for passing at least a portion of the scanning beam to said second detector means when the scanning beam is at said second subsequent position, said deflector means having at least one deflector surface with an edge, said edge being positioned transverse to movement of the scanning beam during a line scan.

* * * * *